United States Patent
Sitaraman et al.

(10) Patent No.: US 7,389,354 B1
(45) Date of Patent: Jun. 17, 2008

(54) PREVENTING HTTP SERVER ATTACKS

(75) Inventors: Aravind Sitaraman, Bangalore (IN); Purnam Anil Sheth, Livermore, CA (US); Shujin Zhang, San Carlos, CA (US); Shuxian Lou, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 840 days.

(21) Appl. No.: 09/734,952

(22) Filed: Dec. 11, 2000

(51) Int. Cl.
G06F 15/16 (2006.01)
G06F 12/14 (2006.01)
G06F 1/26 (2006.01)

(52) U.S. Cl. ............ 709/229; 713/151; 713/153; 713/154; 713/194; 726/13; 726/22; 726/23; 726/24; 726/25; 726/26; 726/27; 726/28; 726/29; 726/30; 726/31; 726/34; 726/35

(58) Field of Classification Search ........ 709/223, 709/233, 234, 235, 14, 225, 226, 227; 713/201, 713/151, 154–155, 161, 164, 167, 168, 189, 713/194; 706/62; 726/13, 22–31, 34, 35; 370/229, 230, 230.1, 232–235
See application file for complete search history.

(56) References Cited

U.S. PATENT DOCUMENTS

| | | | |
|---|---|---|---|
| 5,241,594 A | 8/1993 | Kung .................... | 380/4 |
| 5,655,077 A | 8/1997 | Jones et al. ............ | 395/187.01 |
| 5,671,354 A | 9/1997 | Ito et al. ................ | 395/187.01 |
| 5,684,950 A | 11/1997 | Dare et al. ............. | 395/187.01 |
| 5,708,780 A | 1/1998 | Levergood et al. .... | 395/200.12 |
| 5,715,394 A | 2/1998 | Jabs ....................... | 395/200.11 |
| 5,812,529 A | 9/1998 | Czarnik et al. ........ | 370/245 |
| 5,815,665 A | 9/1998 | Teper et al. ............ | 395/200.59 |
| 5,835,727 A | 11/1998 | Wong et al. ........... | 395/200.68 |

(Continued)

FOREIGN PATENT DOCUMENTS

WO        WO 99/53408        10/1999

OTHER PUBLICATIONS

Implementation of an Intrusion Detection System based on Mobile Agents, Publication date Jun. 10-11, 2000 by Bernardes and Moreira.*

(Continued)

*Primary Examiner*—Ashok Patel
(74) *Attorney, Agent, or Firm*—Thelen Reid Brown Raysman & Steiner LLP

(57) ABSTRACT

A method for preventing denial of service attacks against Hypertext Transfer Protocol (HTTP) servers includes receiving a HTTP request from a subscriber using a first communication network coupled to at least one other communication network, receiving a profile for the subscriber, filtering the request to determine whether the subscriber is authorized to make the request based upon the profile and forwarding the request to the other communication network when the subscriber is authorized to make the request. An apparatus capable of preventing denial of service attacks against HTTP servers includes a profile request generator capable of generating a profile request based upon a HTTP request received from a subscriber using a first communication network, a filter capable of determining whether the request is authorized based upon the requested profile and an authorizer capable of allowing the request to be forwarded on at least one other communication network coupled to the first communication network.

32 Claims, 7 Drawing Sheets

U.S. PATENT DOCUMENTS

| | | | | |
|---|---|---|---|---|
| 5,845,070 | A | 12/1998 | Ikudome | 395/187.01 |
| 5,898,780 | A | 4/1999 | Liu et al. | 380/25 |
| 5,933,625 | A | 8/1999 | Sugiyama | 395/557 |
| 5,944,824 | A | 8/1999 | He | 713/201 |
| 5,968,116 | A | 10/1999 | Day, II et al. | 709/202 |
| 5,974,453 | A | 10/1999 | Andersen et al. | 709/220 |
| 5,987,232 | A | 11/1999 | Tabuki | 395/187.01 |
| 5,991,810 | A | 11/1999 | Shapiro et al. | 709/229 |
| 5,991,828 | A | 11/1999 | Horie et al. | 710/8 |
| 6,006,334 | A | 12/1999 | Nguyen et al. | 713/202 |
| 6,011,910 | A | 1/2000 | Chau et al. | 395/200.59 |
| 6,021,429 | A | 2/2000 | Danknick | 709/208 |
| 6,021,496 | A | 2/2000 | Dutcher et al. | 713/202 |
| 6,026,441 | A | 2/2000 | Ronen | 709/227 |
| 6,044,155 | A | 3/2000 | Thomlinson et al. | 380/49 |
| 6,047,376 | A | 4/2000 | Hosoe | 713/201 |
| 6,065,980 | A | 5/2000 | Leung et al. | 439/92 |
| 6,081,419 | A | 6/2000 | Pham | 361/617 |
| 6,091,951 | A | 7/2000 | Sturniolo et al. | 455/432 |
| 6,092,178 | A | 7/2000 | Jindal et al. | 712/27 |
| 6,092,196 | A | 7/2000 | Reiche | 713/200 |
| 6,119,160 | A | 9/2000 | Zhang et al. | 709/224 |
| 6,122,657 | A | 9/2000 | Hoffman, Jr. et al. | 709/201 |
| 6,141,687 | A | 10/2000 | Blair | 709/225 |
| 6,189,019 | B1 * | 2/2001 | Blumer et al. | 715/513 |
| 6,334,121 | B1 * | 12/2001 | Primeaux et al. | 706/62 |
| 6,484,203 | B1 * | 11/2002 | Porras et al. | 709/224 |
| 6,496,802 | B1 * | 12/2002 | van Zoest et al. | 705/14 |
| 6,701,438 | B1 * | 3/2004 | Prabandham et al. | 713/201 |
| 6,751,668 | B1 * | 6/2004 | Lin et al. | 709/227 |
| 6,823,387 | B1 * | 11/2004 | Srinivas | 709/227 |
| 2002/0032871 | A1 * | 3/2002 | Malan et al. | 713/201 |
| 2002/0035698 | A1 * | 3/2002 | Malan et al. | 713/201 |

OTHER PUBLICATIONS

Building Survivable Systems: An integrated approach based on intrusion detection and damage continment,Publication date Jan. 25-27, 2000, by Bowen, Chee, Segal, Sekar, Shanbhag and Uppuluri.*

Strother, E., "Denial of Service Protection, The Nozzle", IEEE 2000, p. 32-41.*

Bellovin, Steven M., "Problem Areas for the IP Security Protocols", Jul. 22-25, 1996, Proceedings of the Sixth Usenix UNIX Security Symposium, San Jose, CA.

Cisco 6400 Access Concentrators, printed from http://www.cisco.com/warp.public/cc/pd/as6400/index.shtml on Sep. 27, 2000.

Cisco 6400 Universal Access Concentrator, Data Sheet, printed from http://www.cisco.com/warp.public.cc.pd.as.6400.prodlit/6400_ds.htm on Sep. 27, 2000.

Cisco 6400 Universal Access Concentrator, Product Bulletin—No. 1120, printed from http://www.cisco.com/warp.public.cc.pd.as.6400.prodlit/1120_pp.htm on Oct. 4, 2000.

Cisco Asymmetric Digital Subscriber Line Services Architecture, White Paper, printed from http://www.cisco.com.warp.public/cc/so/neso/dsso/global/ads1_wp.htm on Sep. 27, 2000.

"Cisco User Control Point", pp. 1-4, printed from http://www.cisco.com/warp/public/728/ucpds.htm on Sep. 10, 1998.

"IBM Introduces New Subscriber Management System for Internet Service Providers", Dec. 2, 1998, IBM Corporation, printed from http://www.cisco.com/univercd/cc/td/doc/products/software/ios113ed/113t/113t3/ispec.

"IPSec Network Security", pp. 1-69, printed from http://www.cisco.com/univercd/cc/td/doc/products/software/ios113ed/113t/113t3/ipsec.

Layer 2 Tunnel Protocol, Release 12.0(1)T and 11.3(5)AA.

"L2TP", 1998, Mecklermedia Corporation, printed from http://www/webopedia.internet.com/TERM/L/L2TP/html.

"MultiVPN from Ascend Communications: Breaking Down the Barriers to VPNs", Ascend Communications, Inc., White Paper, 1998.

Patel, B., et al., "Securing L2TP using IPSEC", May 1998, PPPEXT Working Group, pp. 1-10, printed from http://www.masinter.net/~l2tp/ftp/draft-ietf-pppext-l2tp-security-02.txt.on Sep. 21, 1998.

"Remote Access Network Security", Ascend Communications, Inc., printed from http://www.ascend.com/1103.html, on Jul. 24, 1998, pp. 1-8.

Rigney, et al., "Remote Authentication Dial In User Service (RADIUS)", Network Working Group, RFC 2138, Apr. 1997, pp. 1-57.

Rosen, et al., "Multiprotocol Label Switching Architecture", Apr. 1999, Network Working Group, Internet-Draft, pp. 1-62.

Stein, Lincoln D., "Creating a Self-Referencing URL that Preserves State Information", http://www.hensa.ac.uk.ftp.mirrors.perl-CPAN/doc/wwwman/CGI-pm/CGI/creating_a_self_referencing_URL_.html, 1995.

Tunneling, 1998, Meckermedia Corporation, printed from http://webopedia.internet.com/TERM/t/tunneling.html.

Carrel, D. et al., The TACACS+ Protocol, Version 1.78, Cisco Systems, Inc., printed from ftp://ftp-eng.cisco.com/edweber/tac-rfc.1.78.txt on Oct. 23, 2000.

Internet Security Bulletin, "AL-96.06—Continued HTTP Server Attacks Using PHF,", AusCERT (Australian Computer Emergency Response Team), http://www.auscert.org.au/render.html?it=73, University of Queensland, Jan. 6, 1977, 2 pages.

Internet paper, "CERT® Advisory CA-1996-06 Vulnerability in NCSA/Apache Example Code," CERT® Coordination Center, Software Engineering Institute, http://www.cert.org/advisories/CA-1996-06.html, Mar. 20, 1996 (Rev. Sep. 24, 1997), 6 pages.

Cisco 6400 Universal Access Concentrator, Data Sheet, printed from http://www.cisco.com/warp.public.cc.pd.as.6400.prodlit/6400_ds.htm on Sep. 27, 2000, posted: Jun. 30, 2000.

Cisco 6400 Universal Access Concentrator, Product Bulletin—No. 1120, printed from http://www.cisco.com/warp.public.cc.pd.as.6400.prodlit/1120_pp.htm on Oct. 4, 2000, released Aug. 2000.

Cisco Asymmetric Digital Subscriber Line Services Architecture, White Paper, printed from http://www.cisco.com.warp.public/cc/so/neso/dsso/global/ads1_wp.htm on Sep. 27, 2000, posted: Jul. 3, 2000.

"Cisco User Control Point", pp. 1-4, printed from http://www.cisco.com/warp/public/728/ucp.ds.htm on Sep. 10, 1998, posted: Jun. 10, 1998.

"IPSec Network Security", pp. 1-69, printed from http://www.cisco/com/univercd/cc/td/doc/products/software/ios113ed/113t/113t3/ipsec., Sep. 10, 1998.

Layer 2 Tunnel Protocol, Release 12.0(1)T and 11.3(5)AA, dated: Sep. 10, 1998.

"L2TP", 1998, Mecklermedia Corporation, printed from http://www/webopedia.internet.com/TERM/L/L2TP/html, no date.

Rosen, et al., "Multiprotocol Label Switching Architecture", Apr. 1999, Network Working Group, Internet-Draft, pp. 1-62.

Stein, Lincoln D., "Creating a Self-Referencing URL that Preserves State Information", http://www.hensa.ac.uk.ftp.mirrors.perl-CPAN/doc/wwwman/CGI-pm/CGI/creating_a_self_referencing_URL_.html, 1995, no date.

Tunneling, 1998, Meckermedia Corporation, printed from http://webopedia.internet.com/TERM/t/tunneling.html, no date.

* cited by examiner

PREVENTING HTTP SERVER ATTACKS

FIELD OF THE INVENTION

The present invention relates to the field of data communications. More particularly, the present invention relates to a system and method for preventing denial of service attacks against Hypertext Transfer Protocol (HTTP) servers.

BACKGROUND OF THE INVENTION

The World Wide Web ("Web" or "WWW") is a vast network of computer servers, computer clients and telecommunication data lines for sending and receiving data (or "content"). The Web servers send text or binary content to client programs. Text data includes specially formatted text documents (or "Web pages") written using the Hypertext Markup Language (HTML) protocol. The users use client programs such as "browsers" to establish data connections to Web servers, send requests for data, retrieve content and then view that content. Common browsers include Netscape Navigator® and Microsoft® Internet Explorer. These browsers and other Internet applications include the ability to access a URL (Universal Resource Locator) or "Web" site. The URL is used to specify the location of a file held on a remote machine.

Each URL is composed of several components. For example, the URL http://host/file.html includes three components. The first component, http, specifies the protocol that is used to access the target file. In the present example, the protocol is Hypertext Transfer Protocol (HTTP). A URL may specify other protocols as well. For example, the URL of ftp://ftp.pgp.com/bub/docs/samples specifies access to files via "FTP" (File Transfer Protocol). This specifies a link for accessing the file directory docs/samples on the machine ftp.pgp.com.

The second component, host, indicates the name of the remote machine. This can be expressed either as a domain name (e.g., pgp.com) or a numeric Internet Protocol (IP) address such as 123.200.1.1. The final component, file.html, provides the path name of the target file. In other words, the target file is the file to which the hypertext link is to be made. The file is referenced relative to the base directory in which the Web pages are held.

The HTTP protocol is typically employed to transmit web pages between the client computer and the server computer. According to the HTTP protocol as specified by the Internet Request For Comments RFC 1945 (T. Berners-Lee et al.), clients and servers communicate using request messages and response messages. A request message is sent by a client to a server to initiate some action. Exemplary actions are listed in Table 1.

TABLE 1

| Message | Description |
| --- | --- |
| GET | A request to fetch or retrieve information |
| POST | A request to accept the attached entity as a new subordinate to the identified URL |
| PUT | A request to accept the attached entity and store it under the supplied URL |
| DELETE | Requests that the origin server delete a resource |

The server, in response to a request, returns a response message. A response message may include an entity body containing hypertext-based information. In addition, the response message must specify a status code, which indicates the action taken on the corresponding request.

FIG. 1 is a block diagram that illustrates a single HTTP transaction including a request message and a response message. Client computer 100 has established a data communications connection via the Web 105 to a web server 110. A client application, such as a Web browser, initiates a request for a resource. The resource may be, for example, a home page on a Web server 110. The client 100 opens a connection between the client 100 and the server 110. The client 100 then issues an HTTP request 115. The request 115 consists of a specific command, a URL and a message containing request parameters, information about the client, and possibly additional content information. When the server 110 receives the request 115, it attempts to perform the requested action and returns a HTTP response 120. The response includes status information, a success/error code and a message containing information about the server 110, information about the response itself, and possible content. Further description of HTTP is available in the technical and trade literature; See e.g., William Stallings, *The Backbone of the Web*, BYTE, October 1996.

FIG. 2 shows a simplified diagram of a computer connected to external networks 200 via a host computer 205 linked to an access point 210. An access point 210 is essentially an external location capable of permitting authorized users to access external computer networks. The access point 210 is typically maintained by a computer network service provider, such as a telephone company (Telco) or commercial Internet Service Provider (ISP). The access point 210 serves as a link in the overall network scheme and consists of a series of Network Access Servers (NASs) and other related hardware, software and/or firmware. An access point 210 may also include a modem pool (not shown) maintained by a Telephone Company (Telco) or an Internet Service Provider (ISP) that enables its authorized users or subscribers to obtain external network access through the host computer 205, which has the required dial-up connection capability. The access point 210 may include a gateway device 215, such as the Service Selection Gateway (SSG) Cisco model 6510, manufactured by Cisco Systems, Inc. of San Jose, Calif. and an authentication, authorization and accounting (AAA) server 220, such as Cisco ACS or Cisco Secure, manufactured by Cisco Systems, Inc. of San Jose, Calif.

The Service Selection Gateway (SSG) is a product that allows data communications network users to select and login to services on the data communications network. These services can include computer intranets, pay per use sites, the Internet, community of interest services and the like.

The link between the host 205 and the gateway device 215 is typically a point-to-point link. The AAA server 220 may accommodate several client gateway devices simultaneously and communicate with one another according to a standard Internet protocol, such as the Remote Authentication Dial-In User Service (RADIUS) protocol. RADIUS is protocol standard for communicating authentication, authorization and configuration information between a device that desires to authenticate its links and a shared authentication server. Those of ordinary skill in the art will recognize that other types of access methods may be provided by a Telco or ISP such as frame relay, leased lines or ATM (Asynchronous Transfer Mode). Additionally, access methods may include Digital Subscriber Line-based methods (hereinafter referred to as xDSL) for supporting a host that uses a DSL access method, and/or a cable access method for supporting a host that uses a cable modem.

Typically, when the user desires to access a specified domain, the user runs a network logon application program on the host computer 205 which requires the user to input user identification and authorization information as a means of initiating access to the desired network. This information is then directed to the access point 210 where it is verified to ensure that the host user has the required authorization to permit access to the desired network. Once authorization is granted to the user, a connection is established via the access point 210 with the home gate of the specified domain site (235, 240, 245).

The connection established may be tunnel-based connections (225, 230), such as L2TP (Layer Two Tunneling Protocol) or L2F (Layer Two Forwarding) or an IP-based (Internet Protocol) connection, such as used with ATM or frame relay. The user of the host computer 205, having established such a connection, has the ongoing capability to access the specified domain until the connection is terminated either at the directive of the user or by error in data transmission. The access point 210 will typically have the capability to connect the user to various other privately owned secured domain sites, or the public Internet 200.

As the use of data communications networks increases worldwide, congestion of those networks has become a problem. A given data communications network, a given node on a data communications network, or a given link connecting two nodes has a certain capacity to pass data packets and that capacity cannot be exceeded. Network congestion is exacerbated by denial-of service attacks.

Denial of Service (DoS) attacks attempt to render a computer or network incapable of providing normal services. Denial of Service attacks typically target a computer's network bandwidth or connectivity. Bandwidth attacks flood the network with such a high volume of traffic that all available network resources are consumed, effectively locking out legitimate users. Connectivity attacks flood a computer with such an unusually a high volume of connection requests that all available operating system resources are consumed, thus preventing the computer from processing legitimate user requests. For example, a computer hacker intending to exploit present day HTTP servers could flood the network with many HTTP requests. The resources devoted to handling the large number of HTTP requests generated by the computer hacker could adversely affect services available to other users. If an innocent user makes normal page requests from a website while that website is being subjected to a DoS attack, the requests may fail completely or the pages may download so slowly as to make the website unusable.

A Distributed Denial of Service (DDOS) attack uses many computers to launch a coordinated DoS attack against one or more targets. The perpetrator is able to increase the effectiveness of the Denial of Service by harnessing the resources of multiple unwitting accomplice computers that serve as attack platforms. Typically, a DDoS master program is installed on one computer using a stolen account. At a designated time, the master program communicates to a number of "agent" programs installed on computers anywhere on the Internet. The agents initiate the attack when they receive the command. The master program can initiate hundreds or even thousands of agent programs within seconds.

The currently available solutions to this problem are very limited and do not offer the level of security and service that most Internet users demand. One solution is to secure computers from being hijacked and used as attack platforms by, for example, periodically scanning Internet computers to make sure they are not being used as unwitting DoS attack platforms. This solution cuts the problem off before it can ever manifest. However, this solution is ineffective against computer users that desire to cause DoS attacks. Furthermore, this solution requires a coordinated effort amongst numerous parties around the world to secure Internet computers from becoming unwitting accomplices to such malicious intruders. Unfortunately, for every business that has the knowledge, budget and inclination to make such changes, there are many more which lack such resources.

What is needed is a solution that provides increased protection against HTTP server denial of service attacks.

BRIEF DESCRIPTION OF THE INVENTION

A method for preventing denial of service attacks against Hypertext Transfer Protocol (HTTP) servers includes receiving a HTTP request from a subscriber using a first communication network coupled to at least one other communication network, receiving a profile for the subscriber, filtering the request to determine whether the subscriber is authorized to make the request based upon the profile and forwarding the request to the other communication network when the subscriber is authorized to make the request. An apparatus capable of preventing denial of service attacks against HTTP servers includes a profile request generator capable of generating a profile request based upon a HTTP request received from a subscriber using a first communication network, a filter capable of determining whether the request is authorized based upon the requested profile and an authorizer capable of allowing the request to be forwarded on at least one other communication network coupled to the first communication network.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF A PREFERRED EMBODIMENT

Embodiments of the present invention are described herein in the context of a system and method for preventing denial of service attacks against Hypertext Transfer Protocol (HTTP) servers. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware, computer languages and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

Figure 1:
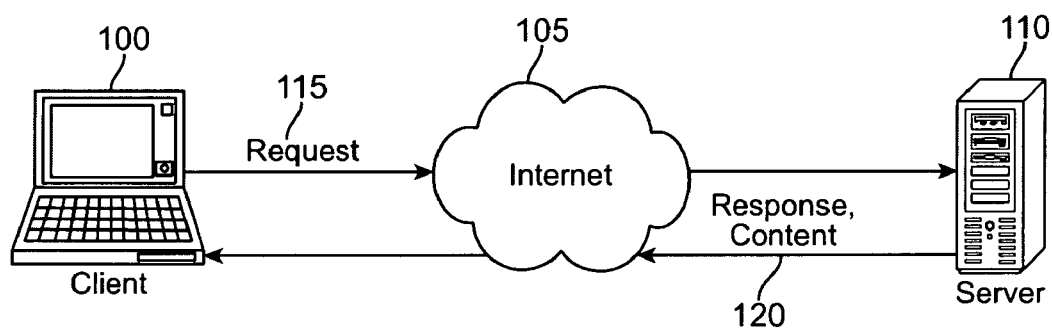
FIG. 1 is a block diagram that illustrates a single HTTP transaction including a request message and a response message.
Figure 2:
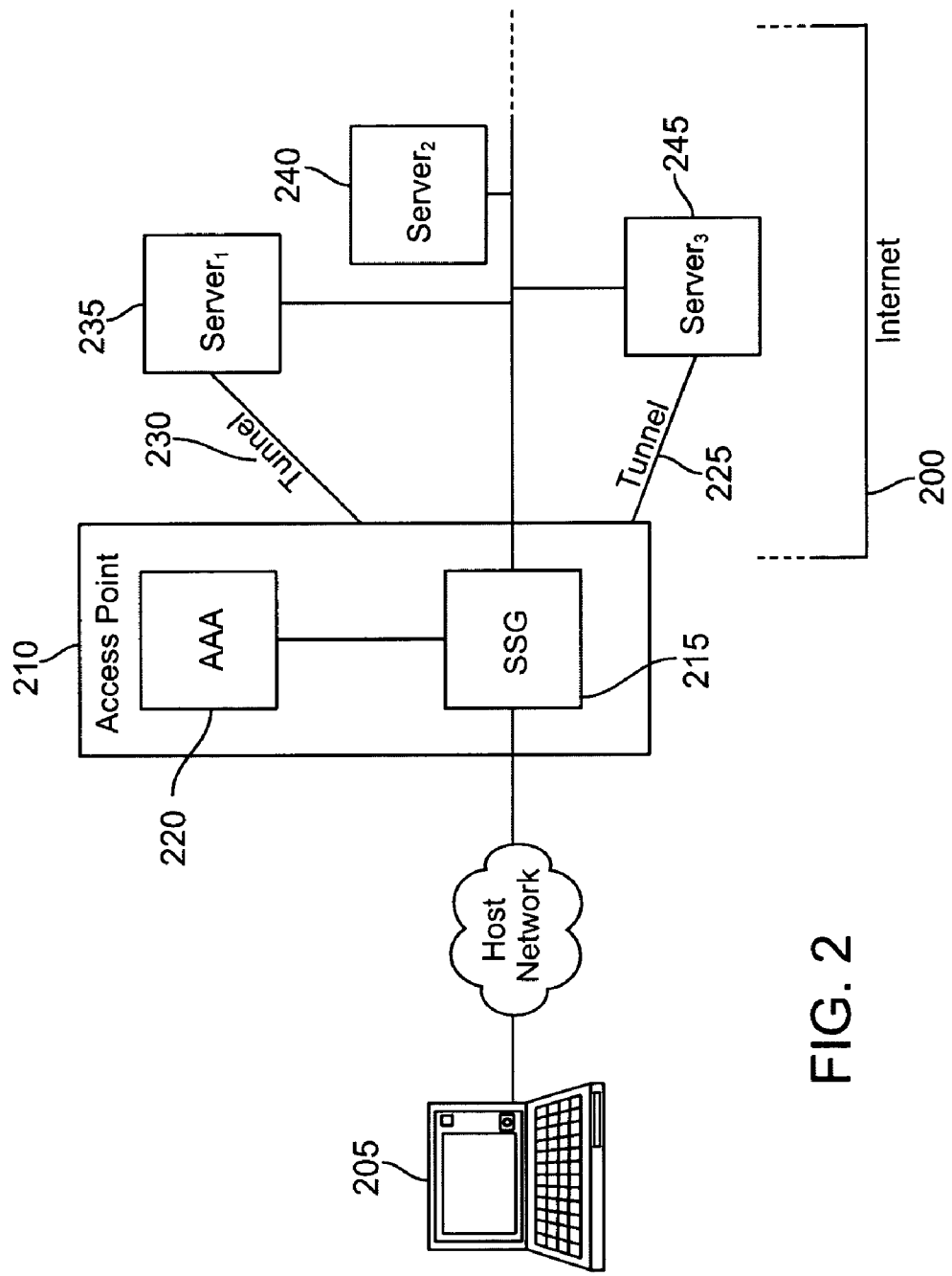
FIG. 2 is a block diagram that illustrates a host computer linked to external networks via an access point.
Figure 3:
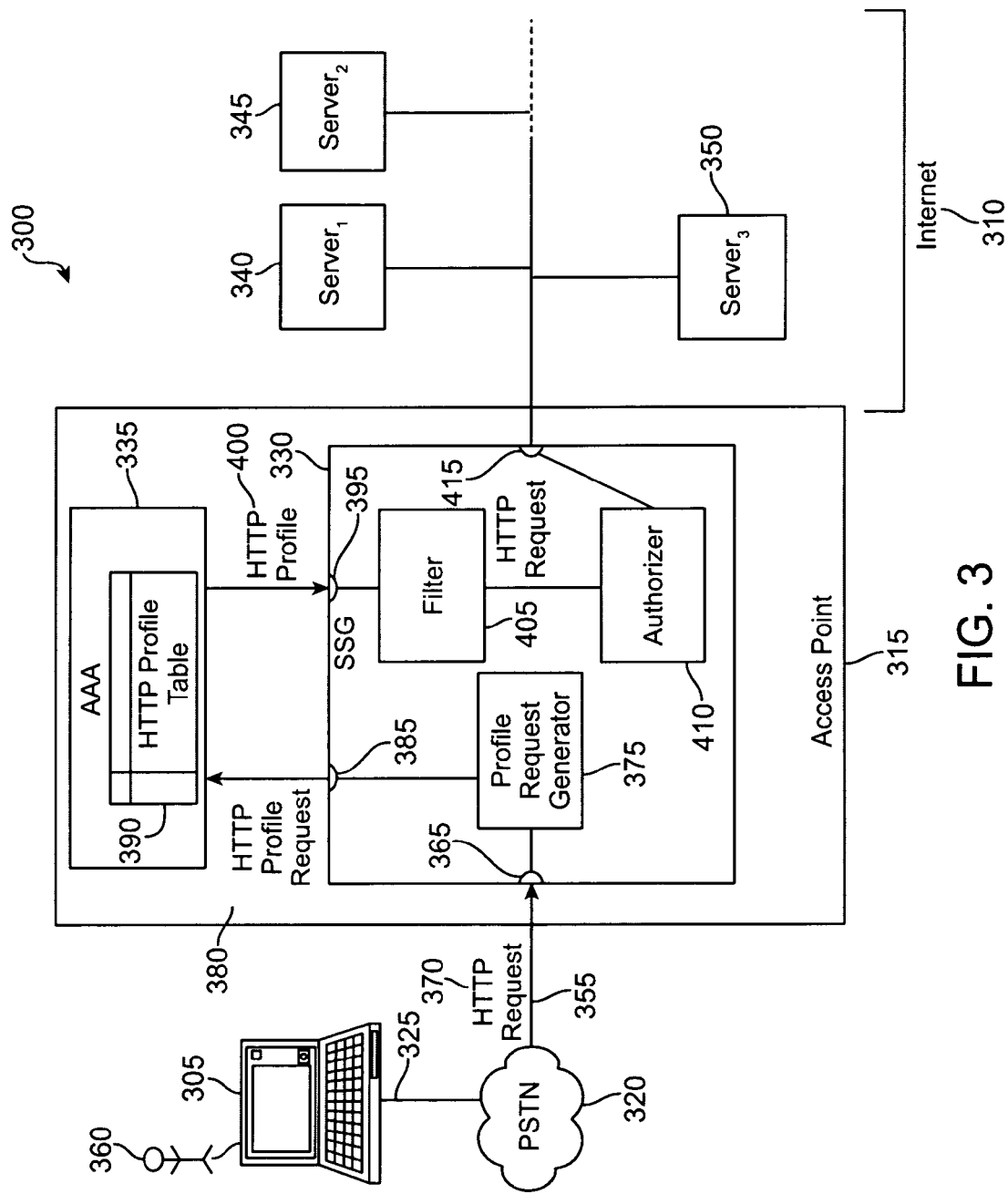
FIG. 3 is a block diagram of an access server that links a host computer to at least one external network in accordance with one embodiment of the present invention.

Turning now to FIG. 3, a block diagram of a computer network 300 in accordance with one embodiment of the present invention is presented. The host 305 is able to connect with a public network domain 310, such as the Internet, and a private network domain through an access point 315. The host computer 305 in this particular computer network is connected to a Publicly Switched Telephone Network (PSTN) 320 via a transmission means 325, such as copper wire or cable. Line coding standards such as xDSL may be used. Those of ordinary skill in the art will recognize that other types of transport mechanisms may be provided by an ISP or Telco such as Ethernet, frame relay, leased lines, ATM (Asynchronous Transfer Mode) or the like.

The access point 315 is, in most instances, maintained by a computer network service provider, such as a telephone company (Telco) or commercial Internet Service Provider (ISP). The access point 315 serves as a link in the overall network scheme and houses various network interfaces and service components capable of routing and transferring data to and from various points on the network. Shown in FIG. 3 are a gateway device 330 and an authentication, authorization and accounting (AAA) server 335. These devices are located within the access point 315 and are used in carrying out the method of preventing HTTP server attacks in accordance with one embodiment of the present invention.

In accordance with one embodiment of the present invention, the components, process steps and/or data structures are implemented using a gateway device, for example the Cisco model 6510 Service Selection Gateway (SSG), manufactured by Cisco Systems, Inc. of San Jose, Calif., or the Cisco model 6400 SSG, also available from Cisco Systems, Inc. of San Jose, Calif. The SSG is a device that couples the user via a network access server (NAS) or other conventional means to a larger data communications network 310 such as the Internet having multiple services 340, 345 and 350 associated with it. SSG 330 preferably creates tunneling connections such as Layer 2 tunneling protocol (L2TP) connections with Services 340, 345 and 350 as required by users. In order for a user host to gain access to a public domain network, such as the Internet, users must first dial-in or otherwise make a connection with the SSG through a data-receiving interface (not shown in FIG. 3).

The term gateway is not meant to be limited to a single type of device, as any device, hardware or software, that may act as a bridge between the user and the network may be considered a gateway for the purposes of this application.

According to one embodiment of the present invention, the PPP protocol is used as the standard method for transporting multi-protocol data packets over point-to-point links. Other similar protocols capable of transporting multi-protocol data packets over point-to-point links could also be used as would be apparent to those of ordinary skill in the art. The link between the host 305 and the gateway device 330 is a point-to-point link.

The AAA service performs user authentication, user authorization and user accounting functions. It may be a Cisco ACS™ product such as Cisco Secure™, available from Cisco Systems, Inc. of San Jose, Calif., or an equivalent product. In accordance with one embodiment of the present invention, the Remote Authentication Dial-In User Service (RADIUS) protocol is used as the communication protocol for carrying AAA information. RADIUS is an Internet standard track protocol for carrying authentication, authorization, accounting and configuration information between devices that desire to authenticate their links and a shared AAA or AAA proxy service. Those of ordinary skill in the art will realize that other authentication protocols such as TACACS+ or DIAMETER can be used as acceptable authentication communications links between the various communications devices that encompass the computer network 300 and still be within the inventive concepts herein disclosed.

The present invention makes use of a user's service profile. A service profile, sometimes referred to as a user profile, contains information relating to a particular user's network access account. For example, it may include an identification of the user's last known home PoP (point of presence) or home gateway located in a PoP. It may include the identification of one or more domain name service(s) (DNS) to use in resolving domain names to IP addresses. It may include details about the user's service agreement with the ISP (internet service provider) servicing the user's account. According to one embodiment of the present invention, such information may include the criteria to determine the number of HTTP requests allowed from the user. The information may also include the actions to be performed when a maximum number of HTTP requests has been exceeded. For example, if the user is a "Platinum" user, he or she might be allowed 1000 HTTP requests directed to the same server over a one-minute period before corrective measures are taken. A normal user might be allowed 10 HTTP requests during the same period before corrective measures are taken.

According to one embodiment of the present invention, the user profile is stored in AAA servers disposed in various locations in the data communications network network and still be within the inventive concepts disclosed herein.

Turning now to FIG. 3, when the user 360 logs-in to the SSG 330, either directly or through one or more intermediate devices, the SSG 330 obtains the user's service profile from an AAA server 335. The user profile will contain an additional field detailing the HTTP protocol profile to be afforded the user in accordance with one embodiment of the present invention. The SSG 330 stores the HTTP protocol profile associated with the user in a local memory or cache associated with the user and filters all subsequent outbound communications forwarded to the Internet 310 or other network during the session.

A first receiving interface 365 of SSG 330 receives a HTTP request 370 that includes a URL. A profile request generator 375 generates a profile request 380 and a first forwarding interface 385 sends the profile request 380 to the AAA server 335. The profile request 380 includes a subscriber ID. The subscriber ID may include information that identifies a subscriber based upon the virtual channel used to receive a communication from the client. This information may include, by way of example, a Virtual Path Identifier (VPI)/Virtual Channel Identifier (VCI), a slot ID for the slot used to receive the communication, a port ID for the port used to receive the communication, or the like. An AAA server 335 receives the profile request 380 and performs a table lookup using table 390 to obtain a profile associated with the subscriber. A second receiving interface 395 receives the requested profile 400. A filter 405 determines whether the HTTP request is acceptable based on the requested profile. An authorizer 410 authorizes the HTTP request based upon the determination made by the filter 405. A third forwarding interface 415 forwards the HTTP request to the HTTP server 340, 345, 350 associated with the requested URL. If the request is unauthorized, anti-HTTP server attack measures are applied. These measures may include, by way of example, setting an alarm, dropping the data packet including the HTTP request or disabling the subscriber's account.

This approach provides a number of important advantages. First, the HTTP profile for the user need only be set once in establishing the user's service profile. The existing AAA system will assure that the user's service profile is available regardless of the PoP that the user logs-in on. Second, maintaining and modifying the HTTP profile associated with a user is quite simple. Third, this approach protects against denial of service attacks.

Figure 4:
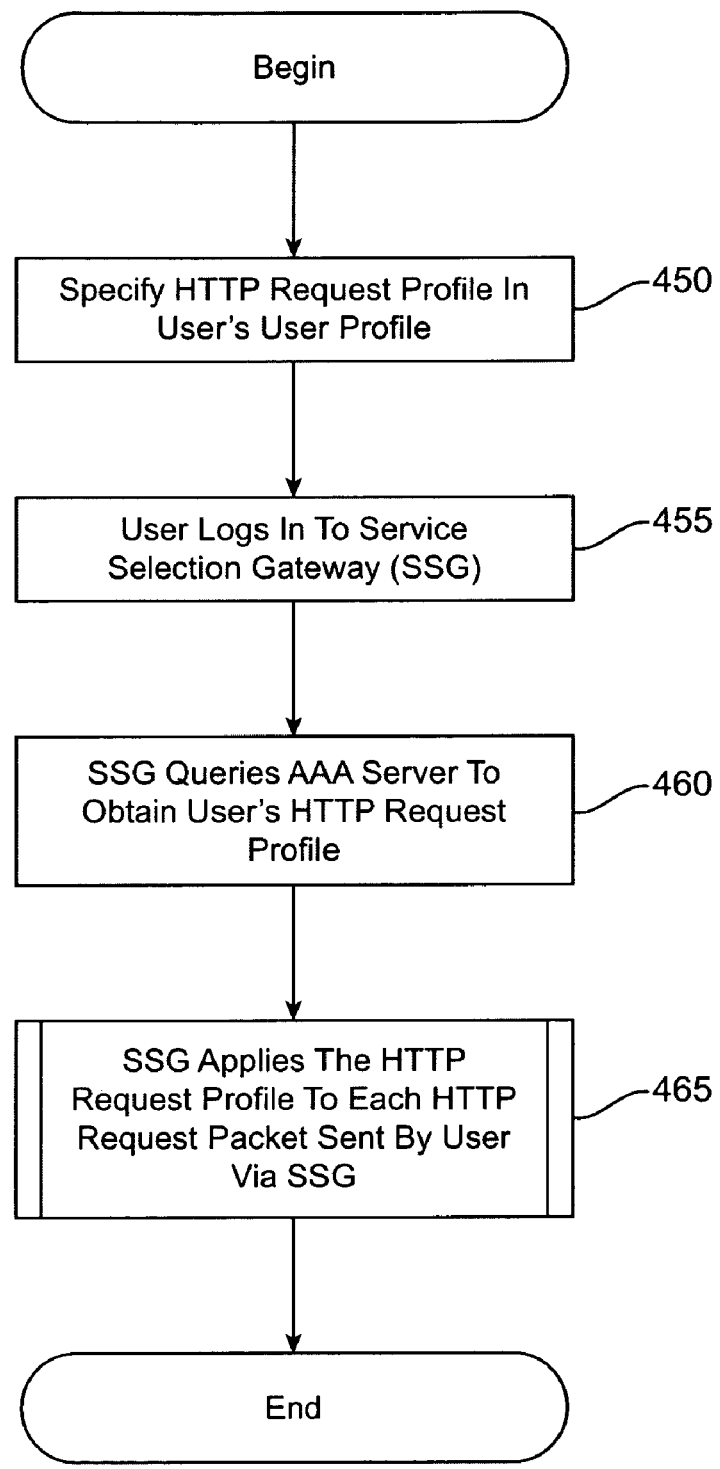
FIG. 4 is a flow diagram that illustrates a method for protecting against HTTP server attacks in accordance with one embodiment of the present invention.

Turning now to FIG. 4, a flow diagram that illustrates a method for protecting against HTTP server attacks in accordance with one embodiment of the present invention is presented. At 450, the HTTP request profile to be afforded all HTTP requests sent by the user is set in the user profile of the user. This is stored in AAA servers preferably distributed about the data communications network. At 455, the user attempts log-in at a PoP containing a service selection gateway, either directly or through a network access server or other intermediate server. At 460, the SSG queries an AAA server using the RADIUS (or an equivalent) protocol and obtains the HTTP request profile specified in the user's service profile. At 465, the SSG applies the HTTP request profile for the user to each HTTP request packet sent by the user via the SSG.

Figure 5:
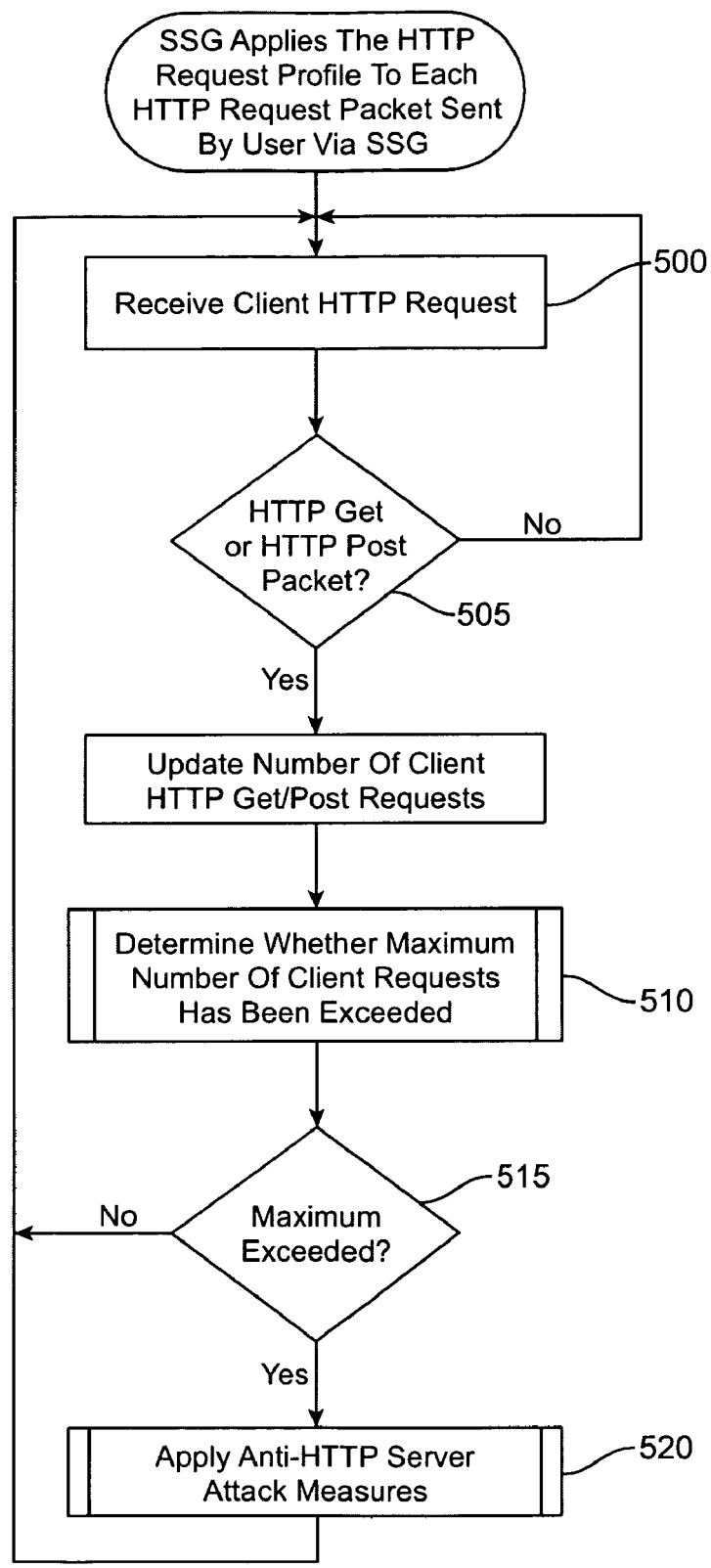
FIG. 5 is a flow diagram that illustrates a method for applying a HTTP request profile accordance with one embodiment of the present invention.

Turning now to FIG. 5, a flow diagram that illustrates a method for applying a HTTP request profile accordance with one embodiment of the present invention is presented. FIG. 5 provides more detail with respect to reference numeral 465 in FIG. 4. At 500, a HTTP request from the client is received. At 505, a determination is made regarding whether the HTTP request is an HTTP Get request packet or an HTTP Post packet. If the answer is "No", the next request is received at 500. If the request is either a HTTP Get request or an HTTP Post request, at 510, the number of client HTTP requests is updated. At 515, a determination is made regarding whether the maximum number of client requests has been exceeded. If the maximum number of client requests has been exceeded, at 520, anti-HTTP server attack measures are applied.

Figure 6:
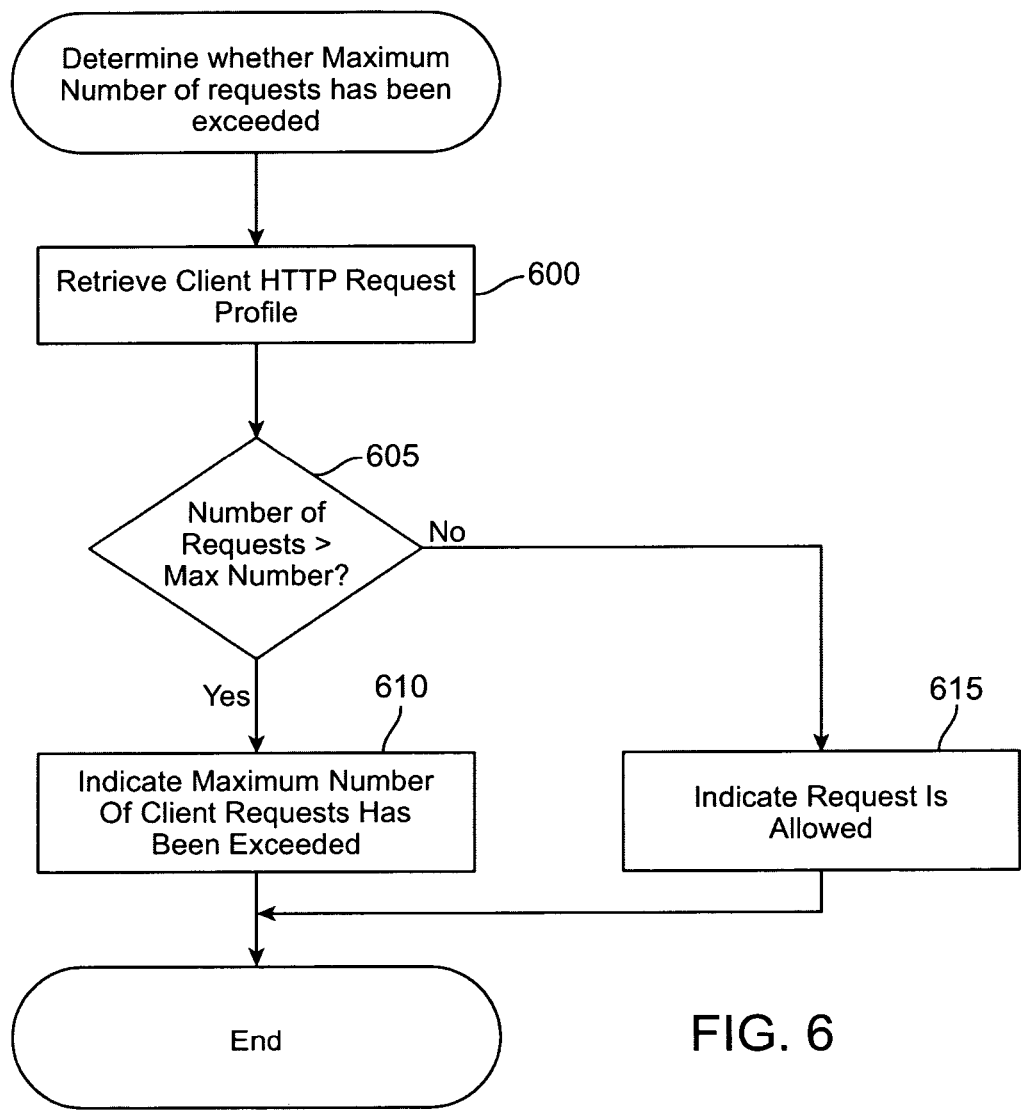
FIG. 6 is a flow diagram that illustrates a method for determining whether the maximum number of requests has been exceeded in accordance with one embodiment of the present invention.

Turning now to FIG. 6, a flow diagram that illustrates a method for determining whether the maximum number of requests has been exceeded in accordance with one embodiment of the present invention is presented. FIG. 6 provides more detail with respect to reference numeral 510 in FIG. 5. At 600, a client HTTP request profile is received. The client HTTP request profile indicates authorized HTTP request behavior for the user and the corrective measures to be taken if a HTTP request is unauthorized. For example, the profile may indicate that a subscriber is allowed a maximum of 100 HTTP requests per second and that the subscriber account should be disabled when the maximum is exceeded.

Still referring to FIG. 6, at 605, a determination is made regarding whether the number of client HTTP requests has exceeded the maximum number of HTTP requests indicated in the HTTP request profile. If the maximum number has been exceeded, an indication to that effect is made at 610. If the maximum number has not been exceeded, an indication that the HTTP request is allowed is made at 615.

Figure 7:
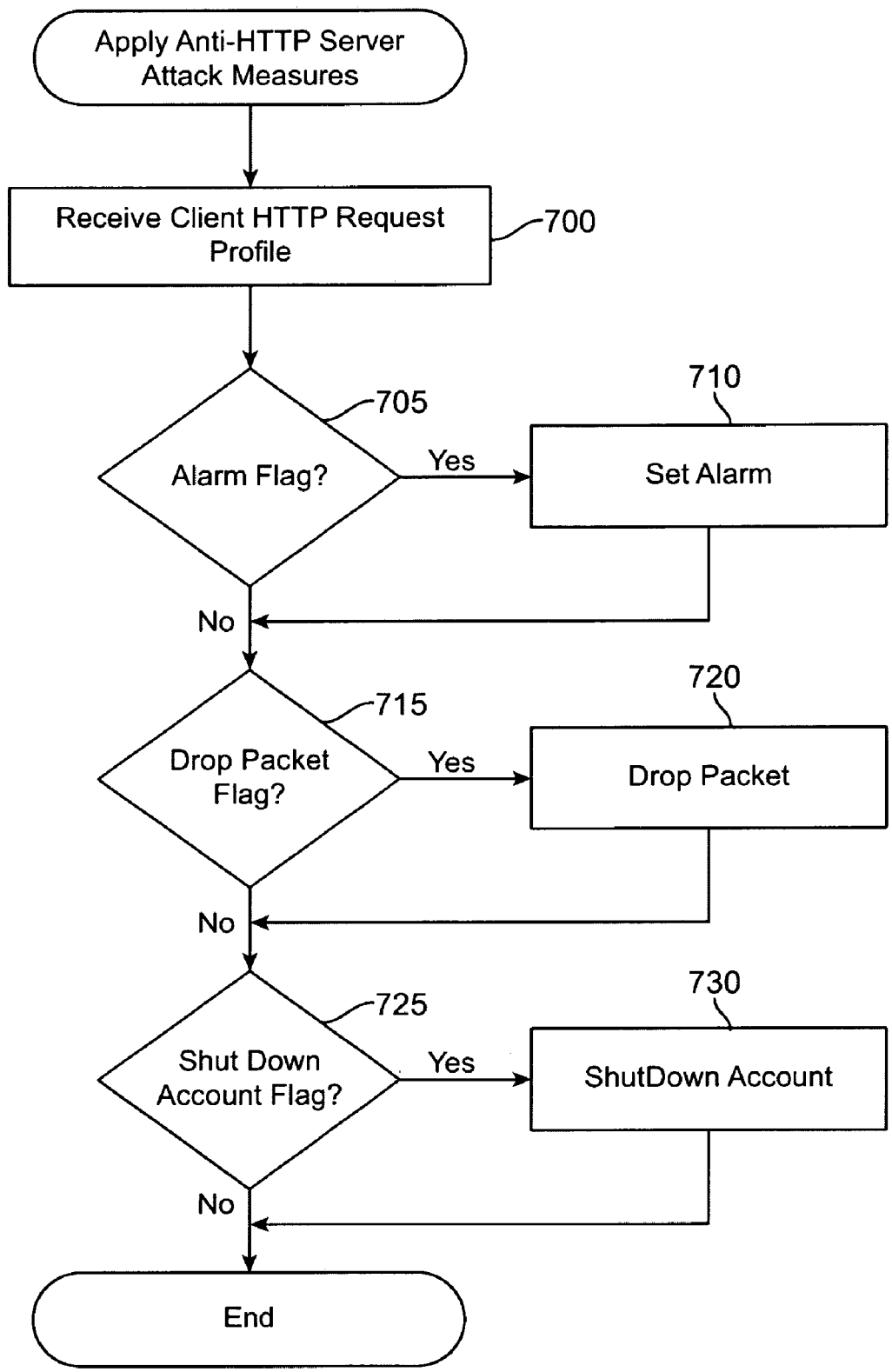
FIG. 7 is a flow diagram that illustrates a method for applying anti-HTTP server attack measures in accordance with one embodiment of the present invention.

Turning now to FIG. 7, a flow diagram that illustrates a method for applying anti-HTTP server attack measures in accordance with one embodiment of the present invention is presented. FIG. 7 provides more detail with respect to reference numeral 520 in FIG. 5. At 700, the client HTTP request profile is received. At 705, a determination is made regarding whether the client HTTP request profile includes an alarm flag. If the profile includes an alarm flag, at 710, an alarm is set. According to one embodiment of the present invention, the alarm-is sent to the ISP of the client.

At 715, a determination is made regarding whether the client HTTP request profile includes a "Drop Packet" flag. If the profile includes a "Drop Packet" flag, the packet including the HTTP request is dropped at 720.

At 725, a determination is made regarding whether the client HTTP request profile includes a "Shut Down Account" flag. If the profile includes a "Shut Down Account" flag, at 730, the client's account is disabled, preventing further HTTP server access via the SSG by the particular client.

According to one embodiment of the present invention, the client's account is disabled for a "hold-down" period when the request count exceeds a maximum HTTP request count. According to another embodiment of the present invention, the hold-down period increases each time the maximum HTTP request count is exceeded. Table 2 illustrates one example of how the hold-down period may change over time in accordance with one embodiment of the present invention. In Table 2, the hold-down period increases exponentially. The client's account is held down for two ($2^1$) seconds when the maximum HTTP Request count is exceeded for a first time. If the maximum is exceeded a second time, the account is held down for four ($2^2$) seconds. If the maximum is exceeded a third time, the account is held down for eight ($2^3$) seconds. Those of ordinary skill in the art will recognize that many other hold-down sequences are possible.

TABLE 2

| Maximum HTTP Request Exceeded Occurrence # | Hold-Down Time (Seconds) |
| --- | --- |
| 1 | 2 |
| 2 | 4 |
| 3 | 6 |
| 4 | 8 |
| 5 | 16 |

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for preventing denial of service attacks against Hypertext Transfer Protocol (HTTP) servers, the method comprising:
   receiving a HTTP request from a subscriber having an established connection over a first communication network coupled to at least one other communication network, the request including a Universal Resource Locator (URL);
   receiving a profile for the subscriber;
   filtering the request to determine whether the subscriber is authorized to make the request based upon the profile, the filtering including:
   updating a client HTTP request count when the request for the URL is a HTTP GET request or a HTTP POST request; and
   applying HTTP server denial of service attack preventative measures when a client HTTP request frequency based on the client HTTP request count exceeds a maximum HTTP request frequency;
   and
   forwarding the request to the at least one other communication network when the subscriber is authorized to make the request.

2. The method of claim 1, wherein the applying further comprises setting an alarm when the client HTTP request frequency exceeds the maximum HTTP request frequency.

3. The method of claim 2, further comprising sending the alarm to an Internet Service Provider (ISP) associated with the subscriber.

4. The method of claim 1, wherein the applying further comprises dropping the data packet containing the request when the client HTTP request frequency exceeds the maximum HTTP request frequency.

5. The method of claim 1, wherein the applying further comprises shutting down the account used to access the first communication network when the client HTTP request frequency exceeds the maximum HTTP request frequency.

6. The method of claim 5, wherein the applying further comprises disabling HTTP requests for a hold-down period when the client HTTP request frequency exceeds the maximum HTTP request frequency.

7. The method of claim 6, further comprising increasing the hold-down period each time sad the client HTTP request frequency exceeds the maximum HTTP request frequency.

8. The method of claim 7, wherein the hold-down period increases exponentially each time the client HTTP request frequency exceeds the maximum HTTP request frequency.

9. A program storage device readable by a machine, embodying a program of instructions executable by the machine to perform a method to prevent denial of service attacks against Hypertext Transfer Protocol (HTTP) servers, the method comprising:
   receiving a HTTP request from a subscriber having an established connection over a first communication network coupled to at least one other communication network, the request including a Universal Resource Locator (URL);
   receiving a profile for the subscriber;
   filtering the request to determine whether the subscriber is authorized to make the request based upon the profile, the filtering including:
   updating a client HTTP request count when the request for the URL is a HTTP GET request or a HTTP POST request; and
   applying HTTP server denial of service attack preventative measures when a client HTTP request frequency based on the client HTTP request count exceeds a maximum HTTP request frequency;
   and
   forwarding the request to the at least one other communication network when the subscriber is authorized to make the request.

10. The program storage device of claim 9, wherein the applying further comprises setting an alarm when the client HTTP request frequency exceeds the maximum HTTP request frequency.

11. The program storage device of claim 10, further comprising sending the alarm to an Internet Service Provider (ISP) associated with the subscriber.

12. The program storage device of claim 9, wherein the applying further comprises dropping the data packet containing the request when the client HTTP request frequency exceeds the maximum HTTP request frequency.

13. The program storage device of claim 9, wherein the applying further comprises shutting down the account used to access the first communication network when the client HTTP request frequency exceeds the maximum HTTP request frequency.

14. The program storage device of claim 13, wherein the applying further comprises disabling HTTP requests for a hold-down period when the client HTTP request frequency exceeds the maximum HTTP request frequency.

15. The program storage device of claim 14, further comprising increasing the hold-down period each time the client HTTP request frequency exceeds the maximum HTTP request frequency.

16. The program storage device of claim 15, wherein the hold-down period increases exponentially each time the client HTTP request frequency exceeds the maximum HTTP request frequency.

17. An apparatus for preventing denial of service attacks against Hypertext Transfer Protocol (HTTP) servers, the apparatus comprising:
 means for receiving a HTTP request from a subscriber having an established connection over a first communication network coupled to at least one other communication network, the request including a Universal Resource Locator (URL);
 means for receiving a profile for the subscriber;
 means for filtering to determine whether the subscriber is authorized to make the request based upon the profile, the means for filtering including:
 means for updating a client HTTP request count when the request for the URL is a HTTP GET request or a HTTP POST request; and
 means for applying HTTP server denial of service attack preventative measures when a client HTTP request frequency based on the client HTTP request count exceeds a maximum HTTP request frequency; and
 means for forwarding the request to the at least one other communication network when the subscriber is authorized to make the request.

18. The apparatus of claim 17, wherein the means for applying further comprises means for setting an alarm when the client HTTP request frequency exceeds the maximum HTTP request frequency.

19. The apparatus of claim 18, further comprising means for sending the alarm to an Internet Service Provider (ISP) associated with the subscriber.

20. The apparatus of claim 17, wherein the means for applying further comprises means for dropping the data packet containing the request when the client HTTP request frequency exceeds the maximum HTTP request frequency.

21. The apparatus of claim 17, wherein the means for applying further comprises means for shutting down the account used to access the first communication network when the client HTTP request frequency exceeds the maximum HTTP request frequency.

22. The apparatus of claim 21, wherein the means for applying further comprises means for disabling HTTP requests for a hold-down period when the client HTTP request frequency exceeds the maximum HTTP request frequency.

23. The apparatus of claim 22, further comprising means for increasing the hold-down period each time the client HTTP request frequency exceeds the maximum HTTP request frequency.

24. The apparatus of claim 23, wherein the hold-down period increases exponentially each time the client HTTP request frequency exceeds the maximum HTTP request frequency.

25. An apparatus capable of preventing denial of service attacks against Hypertext Transfer Protocol (HTTP) servers, the apparatus comprising:
 a first receiving interface capable of accepting a HTTP request received from a subscriber having an established connection originating from a first communication network, the request including a Universal Resource Locator (URL);
 a profile request generator capable of generating a profile request based upon the HTTP request;
 a first forwarding interface capable of sending the profile request to an Authentication, Authorization, and Accounting (AAA) server;
 a second receiving interface capable of accepting a requested profile;
 a filter capable of determining whether the HTTP request is authorized based upon the requested profile, the filter including:
 an updater to update a client HTTP request count when the HTTP request for the URL is a HTTP GET request or a HTTP POST request; and
 a responder to apply HTTP server denial of service attack preventative measures when a client HTTP request frequency based on the client HTTP request count exceeds a maximum HTTP request frequency;
 an authorizer capable of allowing the HTTP request to be forwarded on at least one other communication network coupled to the first communication network; and
 a second forwarding interface capable of forwarding the HTTP request on the at least one other communication network.

26. The apparatus of claim 25, wherein the responder further sets an alarm when the client HTTP request frequency exceeds the maximum HTTP request frequency.

27. The apparatus of claim 26, wherein the responder sends the alarm to an Internet Service Provider (ISP) associated with the subscriber.

28. The apparatus of claim 25, wherein the responder drops the data packet containing the HTTP request when the client HTTP request frequency exceeds the maximum HTTP request frequency.

29. The apparatus of claim 25, wherein sa the responder shuts down the account used to access the first communication network when the client HTTP request frequency exceeds the maximum HTTP request frequency.

30. The apparatus of claim 29, wherein the responder disables HTTP requests for a hold-down period when the client HTTP request frequency exceeds the maximum HTTP request frequency.

31. The apparatus of claim 30, wherein the responder increases the hold-down period each time the client HTTP request frequency exceeds the maximum HTTP request frequency.

32. The apparatus of claim 31, wherein the responder increases the hold-down period exponentially each time the client HTTP request frequency exceeds the maximum HTTP request frequency.

* * * * *